(12) United States Patent
Masuda et al.

(10) Patent No.: US 9,061,882 B2
(45) Date of Patent: Jun. 23, 2015

(54) FASTENING MEMBER

(75) Inventors: Yuichi Masuda, Toyama (JP); Ryuichi Murasaki, Tokyo (JP)

(73) Assignee: YKK Corporation (JP)

( * ) Notice: Subject to any disclaimer, the term of this patent is extended or adjusted under 35 U.S.C. 154(b) by 880 days.

(21) Appl. No.: 13/202,596

(22) PCT Filed: Apr. 30, 2009

(86) PCT No.: PCT/JP2009/058476
§ 371 (c)(1),
(2), (4) Date: Aug. 22, 2011

(87) PCT Pub. No.: WO2010/125675
PCT Pub. Date: Nov. 4, 2010

(65) Prior Publication Data
US 2011/0305864 A1 Dec. 15, 2011

(51) Int. Cl.
| *B68G 7/12* | (2006.01) |
|---|---|
| *B68G 7/05* | (2006.01) |
| *A47C 31/02* | (2006.01) |
| *B60N 2/58* | (2006.01) |

(52) U.S. Cl.
CPC . *B68G 7/12* (2013.01); *A47C 31/02* (2013.01); *B60N 2/5833* (2013.01)

(58) Field of Classification Search
CPC .......... A47C 31/00; A47C 31/02; B68G 7/05; B68G 7/052; B68G 7/12
USPC .......... 428/99, 100, 86, 95; 24/442, 444, 445, 24/452; 297/452.58
See application file for complete search history.

(56) References Cited

U.S. PATENT DOCUMENTS

| 6,206,467 | B1 | 3/2001 | Mense et al. | |
|---|---|---|---|---|
| 2012/0133194 | A1* | 5/2012 | Takehara et al. | 297/452.58 |

FOREIGN PATENT DOCUMENTS

| JP | 11-276734 | A | | 10/1999 |
|---|---|---|---|---|
| JP | 3132984 | B2 | | 2/2001 |
| JP | 2001-137080 | A | | 5/2001 |
| JP | 2001-197970 | A | | 7/2001 |
| JP | 2003-79976 | A | | 3/2003 |
| JP | 2005-192910 | A | | 7/2005 |
| JP | 2006-141619 | A | | 6/2006 |
| KR | 101023347 | B1 | * | 3/2011 |
| WO | WO 2010110042 | A1 | * | 9/2010 |

OTHER PUBLICATIONS

International Search Report and Written Opinion, PCT International Patent Application No. PCT/JP2009/058476, mailed Aug. 4, 2009.

* cited by examiner

*Primary Examiner* — Cheryl Juska
(74) *Attorney, Agent, or Firm* — Kilpatrick Townsend & Stockton LLP

(57) ABSTRACT

A fastening member according to the invention includes right and left sewn areas which are sewn to one member out of a cushion member and a cover material, a hook-and-loop fastener area which is disposed between the right and left sewn areas and which has a plurality of female engagement elements formed on one face thereof, and a connection area which connects between the hook-and-loop fastener area and the respective sewn areas. Here, the connection area is configured to have a lower yarn density than that of the sewn areas and allows the hook-and-loop fastener area to be displaced relatively to the sewn areas. According to the fastening member of the invention, since the fastened cover material can be easily displaced against the cushion member, wrinkling occurrence at the cover material can be prevented when the cover material is assembled to the cushion member.

7 Claims, 10 Drawing Sheets

PRIOR ART

PRIOR ART

FASTENING MEMBER

This application is a national stage application of PCT/JP2009/058476, which is incorporated herein by reference.

TECHNICAL FIELD

The invention relates to a fastening member utilized for fastening a cover material to a cushion member of a vehicle-use seat for an automobile etc., an office chair, and the like.

BACKGROUND ART

In general, a vehicle-use seat for an automobile etc. and an office chair are respectively configured that a cover material such as a seat cover is assembled to a cushion member formed of synthetic resin such as urethane foam formed into a predetermined shape so as to cover a surface of the cushion member. Further, in a vehicle-use seat and the like, the cover material is assembled so as to wrap the cushion member after a part of the cover material is fastened to a surface of the cushion member. In this case, fastening means with a plurality of hook-shaped or mushroom-shaped male engagement elements and a plurality of loop-shaped female engagement elements which are capable of being engaged with and disengaged from the male engagement elements is utilized for fastening the part of the cover material to the surface of the cushion member.

Examples of the vehicle-use seat in which a cover material is fastened to a cushion member by utilizing such fastening means are described in Japanese Patent No. 3132984 (i.e., Patent Document 1), Japanese Patent Laid-open No. 2003-79976 (i.e., Patent Document 2), and so on.

For example, as illustrated in FIG. 12, a vehicle-use seat 60 described in Patent Document 1 includes a cushion member 61 having a concave groove 61a at its surface and a cover material 62 formed by sewing a plurality of cover pieces 62a. Here, the concave groove 61a of the cushion member 61 is arranged at a position corresponding to a seam portion where the cover pieces 62a are sewn.

Further, a first fastening member 63 having a plurality of loop-shaped female engagement elements 63a on its one face is sewn to the cover material 62 along the seam portion of the cover pieces 62a. Hereinafter, the fastening member to be sewn to the cover material 62 side is defined as the first fastening member. In particular, the first fastening member 63 is sewn to the cover material 62 in a state of being curved to be loop-shaped so that the female engagement elements 63a are oriented outward. Meanwhile, a second fastening member 64 having a plurality of mushroom-shaped male engagement elements 64a is fixed to a bottom portion of the concave groove 61a which is formed at the cushion member 61. Hereinafter, the fastening member to be fixed to the cushion member 61 side is defined as the second fastening member. The second fastening member 64 is integrated with the cushion member 61 by mold-in forming.

In the vehicle-use seat 60 of Patent Document 1 having the above structure, the cover material 62 is easily fastened to the cushion member 61 by engaging the female engagement elements 63a of the first fastening member 63 which is sewn to the cover material 62 with the male engagement elements 64a of the second fastening member 64 which is fixed into the concave groove 61a of the cushion member 61.

In a vehicle-use seat described in Patent Document 2 as well, a cover material is fastened to a surface of a cushion member by engaging female engagement elements of a first fastening member which is sewn to a seam portion of the cover material with male engagement elements of a second fastening member arranged in a concave groove of the cushion member. Accordingly, the means and method to fasten the cover material to the cushion member are substantially the same as those in Patent Document 1.

Further, for example, U.S. Pat. No. 6,206,467 (i.e., Patent Document 3) describes that a cover material 73 is fastened to a cushion member 74 by utilizing first and second fastening members 71, 72 as illustrated in FIG. 13.

In Patent Document 3, a concave groove 74a of the cushion member 74 is formed deeply from a surface of the cushion member 74. Then, the second fastening member 72 is fixed to a bottom face of the concave groove 74a as being integrated with the cushion member 74. Further, the second fastening member 72 includes a base plate 72a, a plurality of hook-shaped male engagement elements 72b formed on one face of the base plate 72a, and a plurality of loop-shaped portions 72c arranged on the other face of the base plate 72a. Here, fixing strength of the second fastening member 72 against the cushion member 74 is enhanced by embedding the plurality of loop-shaped portions 72c into the cushion member 74.

The first fastening member 71 in Patent Document 3 includes a plate portion 71b having a plurality of loop-shaped female engagement elements 71a on its one face and a tape portion 71c of which one end side is sewn to the other face of the plate portion 71b. Then, the other end side of the tape portion 71c is sewn to a seam portion of the cover material 73. The first fastening member 71 fastens the cover material 73 to the cushion member 74 by stably engaging the female engagement elements 71a of the plate portion 71b with the male engagement elements 72b of the second fastening member 72 which is fixed to the bottom face of the concave groove 74a owing to the tape portion 71c even though the concave groove 74a of the cushion member 74 is deeply formed. According to description of Patent Document 3, since the first fastening member 71 and the second fastening member 72 are arranged at a deep position from the surface of the cushion member 74 as described above, the engagement state between the first and second fastening members 71, 72 is to be maintained even when a person sits on the vehicle-use seat, for example.

By the way, in a vehicle-use seat in the conventional art, a cover material is assembled to a cushion member so as to cover the cushion member by engaging an end part of the cover material with a back face of the cushion member as pulling the end portion of the cover material toward the back face so as to wrap a side face of the cushion member after covering a surface of the cushion member with the cover material and fastening the cover material at a predetermined position by utilizing the first and second fastening members as described in Patent Document 1 to 3.

Here, in the case that a part of the cover material is fastened to the cushion member before assembling the cover material to the cushion member as described above, relative positional relation between the cover material and the cushion member is to be fixed as a result of the fastening. For example, owing to occurrence of shifting of the fastening position of the cover material during fastening of the cover material to the cushion member, there has been a case of deceasing of seat appearance (i.e., finish quality) as a result of occurrence of wrinkling at the cover material caused by the shifting of the fastening position at the time of subsequent assembling of the cover material to the cushion member as engaging the end portion of the cover material with the back face of the cushion member. In the case of the above wrinkling occurrence at the cover material caused by the shifting of the fastening position, it has been required to re-perform assembling operation of the cover material after once detaching the cover material from the cushion member. Accordingly, there has been a problem of causing productivity decrease.

Further, in general, the cover material is prepared by sewing a plurality of cover pieces. Here, owing to difficulty of accurate matching in dimensions and shapes among the respective cover materials, there has been a case of variation occurrence of prepared cover materials in dimensions and shapes. In this case, if assembling operation to fasten the cover material to the cushion member is simply repeated, wrinkling is more likely to occur at the cover material assembled to the cushion member.

Accordingly, at the time of assembling the cover material, an operator has been required to carefully perform assembling operation as checking a state of the cover material etc. so as to prevent wrinkling occurrence at the cover material. As a result, there has been a problem of increase of burden to an operator while causing decrease of assembling operability of the cover material.

Hence, for example, Japanese Patent Laid-open No. 2001-197970 (i.e., Patent Document 4) discloses a vehicle-use seat 80 in which a foamed resin slab 85 is arranged between a cover material 82 and a first fastening member 83 sewn to the cover material 82 as illustrated in FIG. 14 to prevent wrinkling occurrence at the cover material 82 to be assembled to a cushion member 81.

More specifically, in the vehicle-use seat 80 of Patent Document 4, the first fastening member 83 and the foamed resin slab 85 are sewn together to the cover material 82 with sewing yarns 86 in a state that the foamed resin slab 85 is arranged between the cover material 82 and the first fastening member 83. Then, the cover material 82 is fastened to the cushion member 81 by engaging the first fastening member 83 which is sewn to the cover material 82 with a second fastening member 84 which is fixed to the cushion member 81.

According to description of Patent Document 4, positional shifting can be absorbed by the foamed resin slab 85 which is arranged between the cover material 82 and the first fastening member 83 even if a fastening position of the cover material 82 is shifted against the cushion member 81, for example. Here, it is described that wrinkling occurrence at the cover material 82 which is assembled to the cushion member 81 can be suppressed and that operability of assembling the cover material 82 and productivity can be improved accordingly as the assembling operation of the cover material 82 can be easily performed.

CITED DOCUMENT

Patent Document

Patent Document 1: Japanese Patent No. 3132984
Patent Document 2: Japanese Patent Laid-open No. 2003-79976
Patent Document 3: U.S. Pat. No. 6,206,467
Patent Document 4: Japanese Patent Laid-open No. 2001-197970

SUMMARY OF THE INVENTION

Problems to be Solved by the Invention

In the vehicle-use seat 80 described in Patent Document 4, the first fastening member 83 and the foamed resin slab 85 are sewn to a seam portion of the cover material 82 with the common sewing yarns 86, as illustrated in FIG. 14. In this case, since the first fastening member 83 is fixed to the cover material 82 with the sewing yarns 86, displacement of the first fastening member 83 is extremely small relatively to the cover material 82 even though the foamed resin slab 85 is arranged between the first fastening member 83 and the cover material 82.

Therefore, when the cover material 82 is fastened to the cushion member 81 as the first fastening member 83 which is sewn to the cover material 82 and the second fastening member 84 which is fixed to the cushion member 81 are mutually engaged, the cover material 82 is hardly moved from the position being fastened to the cushion member 81. Further, even though the foamed resin slab 85 is arranged, largeness (i.e., degree of freedom) of displacement of the cover material 82 from the fastened position is extremely small.

Accordingly, even though it is described that positional shifting can be absorbed by the foamed resin slab 85 in a case that the fastened position of the cover material 82 is shifted when the cover material 82 is fastened to the cushion member 81, for example, a possible range (i.e., largeness) of absorbing the positional shifting is extremely small and the effect to prevent wrinkling occurrence is extremely limited.

To address the above issues, the invention specifically provides a fastening member capable of easily assembling a cover material to a cushion member while effectively preventing wrinkling occurrence at the cover material and capable of improving appearance of products to be manufactured even if a position of the cover material fastened to the cushion member is shifted or even if variation in dimensions and shapes occurs at each cover material.

Means for Solving the Problems

Issues of the invention can be achieved with a fastening member which is most mainly characterized by including: a pair of right and left sewn areas which are woven or knitted to be sewn to one member out of a cushion member and a cover material to cover a surface of the cushion member; a hook-and-loop fastener area which is disposed between the right and left sewn areas and which has a plurality of female engagement elements or male engagement elements formed on one face of the hook-and-loop fastener area; and a connection area which connects between the hook-and-loop fastener area and the respective right and left sewn areas, being characterized in that the connection area is configured to have a lower yarn density than that of the sewn areas and allows the hook-and-loop fastener area to be displaced relatively to the sewn areas; and the cover material is fastened to the cushion member by engaging the hook-and-loop fastener area with male engagement elements or female engagement elements which are arranged at the other member.

In the fastening member according to the invention, it is preferable that the connection area allows the hook-and-loop fastener area to be displaced relatively to the sewn areas in another direction than a connection direction of the connection area.

Further, in the fastening member according to the invention, it is preferable that the right and left connection areas directly connect between the hook-and-loop fastener area and the respective right and left sewn areas.

In this case, it is preferable that the sewn areas and the hook-and-loop fastener area are woven, and the connection areas are formed of only weft yarns or are formed of a weaving structure having a lower density of warp yarns than that of the sewn areas.

Further, the sewn areas and the hook-and-loop fastener area may be knitted, and the connection areas may be formed by utilizing weft in-laid yarns which are to be laterally laid into the sewn areas and the hook-and-loop fastener area.

Furthermore, the sewn areas and the hook-and-loop fastener area may be knitted, and the connection areas may be formed by utilizing weft in-laid yarns, knitting yarns or connecting yarns which connect between a wale arranged at each end edge of the hook-and-loop fastener area and a wale arranged at each inner end edge of the sewing areas.

Further, in the fastening member according to the invention, it is preferable that the fastening member includes an intermediate tape area between the right and left sewn areas, and the connection area connects between the hook-and-loop fastener area and the intermediate tape area.

Effects of the Invention

The fastening member according to the invention includes a pair of right and left sewn areas to be sewn to one member out of a cushion member and a cover material to cover a surface of the cushion member, a hook-and-loop fastener area which is disposed between the right and left sewn areas and which has a plurality of female engagement elements (or male engagement elements) formed on its one face, and at least one connection area which connects between the hook-and-loop fastener area and the respective right and left sewn areas. Then, the connection area is configured to have a lower yarn density than that of the sewn areas.

Here, the yarn density denotes the number of warp yarns and weft yarns per unit area when the fastening member is woven and denotes the number of knitting yarns (including in-laid yarns) per unit area when the fastening member is knitted. In the invention, the sewn area, the hook-and-loop fastener area, and the connection area can be reworded to a sewn portion, an engagement portion, and a connection portion, respectively.

That is, in the fastening member of the invention, the connection area (i.e., the connection portion) capable of being easily deformed as being configured to have a low yarn density is disposed between the hook-and-loop fastener area (i.e., the engagement portion) and the right and left sewn areas (i.e., the sewn portions). Accordingly, the fastening member allows the hook-and-loop fastener area to be displaced relatively to the right and left sewn areas as causing the displacement by utilizing movement, elasticity and the like of structural yarn stripes which constitute the connection area.

With the above fastening member of the invention, the cover material can be easily fastened to the cushion member by sewing the fastening member to one member out of the cushion member and the cover material and further engaging the hook-and-loop fastener area of the fastening member with male engagement elements or female engagement elements which are arranged at the other member.

Further, when the cover material is fastened to the cushion member by utilizing the fastening member of the invention, the cover material can be easily displaced against the cushion member. In addition, largeness (i.e., degree of freedom) of displacement of the cover material can also be ensured to be larger compared to the case of Patent Document 4, for example.

Accordingly, for example, even in a case that a position of the cover material is shifted when the cover material is fastened to the cushion member or in a case that variation in dimensions and shapes occurs at each cover material, wrinkling occurrence at the cover material can be effectively prevented when the cover material is assembled to the cushion member owing to relative displacement of the hook-and-loop fastener area of the fastening member against the sewn areas. Accordingly, it is possible to obtain a seat with excellent appearance (i.e., finish quality).

In particular, the connection area of the fastening member of the invention allows the hook-and-loop fastener area to be displaced relatively to the right and left sewn areas in other directions than the connection direction of the connection area, and preferably, to be displaced relatively at least in the length direction of the sewn areas as being one of the other directions. With this structure, even after the cover material is fastened to the cushion member, wrinkling occurrence at the cover material can be prevented as the cover material being easily moved against the cushion member.

In the above fastening member of the invention, the hook-and-loop fastener area and the respective right and left sewn areas are directly connected with the respective right and left connection areas. With this structure, the hook-and-loop fastener area can be easily displaced against the right and left sewn areas.

Here, the fastening member of the invention allowing the hook-and-loop fastener area to be relatively displaced at least in the length direction of the sewn areas can be easily structured by forming the connection areas only of weft yarns or of a weaving structure having a lower density of warp yarns than that of the sewn areas while the sewn areas and the hook-and-loop fastener area are woven.

Alternatively, the fastening member of the invention allowing the hook-and-loop fastener area to be relatively displaced at least in the length direction of the sewn areas can be easily structured as well by forming the connection areas utilizing weft in-laid yarns which are to be laterally laid into the sewn areas and the hook-and-loop fastener area while the sewn areas and the hook-and-loop fastener area are knitted.

Alternatively, the fastening member of the invention allowing the hook-and-loop fastener area to be relatively displaced at least in the length direction of the sewn areas can be easily structured as well by forming the connection areas utilizing weft in-laid yarns, knitting yarns or connecting yarns which connect between a wale arranged at each end edge of the hook-and-loop fastener area and a wale arranged at each inner end edge of the right and left sewing areas while the sewn areas and the hook-and-loop fastener area are knitted.

Alternatively, in the fastening member of the invention, it is also possible that an intermediate tape area is arranged between the right and left sewn areas and that the connection area connects between the hook-and-loop fastener area and the intermediate tape area. When the fastening member of the invention is structured as described above, the hook-and-loop fastener area can be easily displaced against the right and left sewn areas. In particular, in this case, the hook-and-loop fastener area can be easily displaced in the length direction of the sewn areas and in the width direction of the intermediate tape area.

BEST MODE FOR CARRYING OUT THE INVENTION

In the following, embodiments of the invention will be described in detail with reference to the drawings. In the following description, the right-left direction denotes the width direction of a fastening member, in other words, the direction to sides where sewn areas are arranged against a hook-and-loop fastener area when the fastening member is woven or knitted. Further, the front-rear direction denotes the length direction of sewn areas, that is, the direction in which the fastening member is to be woven or knitted.

Here, not limited to the embodiments described in the following, the invention can be variously modified as long as having substantially the same structure as that of the invention and similar operational effects.

For example, a fastening member described in each embodiment in the following is utilized as a first fastening member sewn to a cover material of a vehicle-use seat for an automobile. However, it is also possible that a fastening member of the invention is utilized as a second fastening member which is fixed to a cushion member. Further, a fastening member of each embodiment has loop-shaped female engagement elements. However, it is also possible that the invention includes hook-shaped or mushroom-shaped male engagement elements instead of the female engagement elements. Further, the fastening member of the invention may be utilized for a seat arranged in a vehicle other than an automobile, an office chair, or the like.

Further, a weaving structure or a knitting structure constituting a hook-and-loop fastener area, a connection area and a sewn area of each fastening member is not particularly limited. A weaving structure or a knitting structure of each area may be arbitrarily changed as long as the yarn density of the connection area is configured to be smaller than that of the sewn area. Furthermore, dimensions etc. of the hook-and-loop fastener area, the connection area and the sewn area may be arbitrarily changed.

First Embodiment

Figure 1:
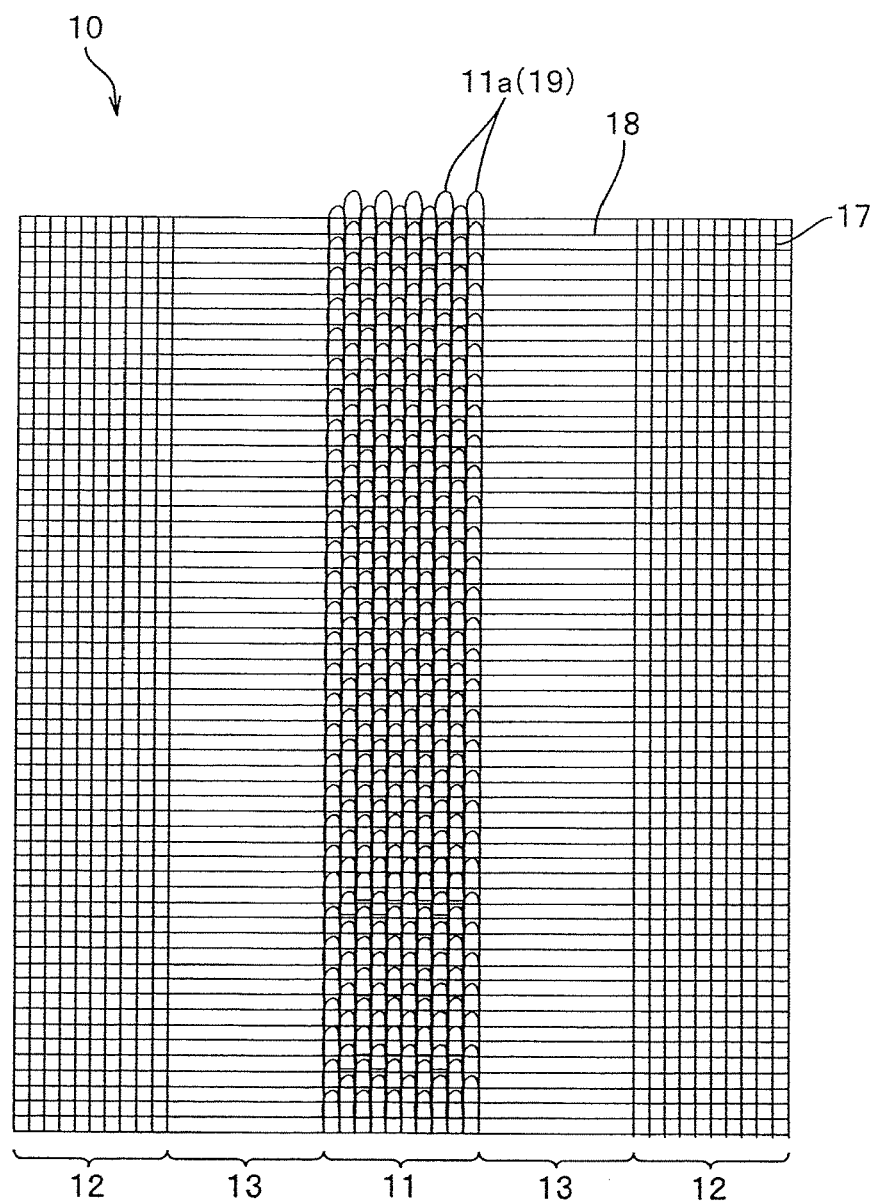
FIG. 1 is a front view schematically illustrating a fastening member according to the first embodiment of the invention.

FIG. 1 is a front view schematically illustrating a fastening member according to the first embodiment.

As described later, a fastening member 10 of the first embodiment being utilized as a first fastening member which is to be sewn to a cover material 2 of a vehicle-use seat 1 is woven by utilizing a normal loom with which weft yarns 18 are transversely laid in the same openings of warp yarns 17 as being reciprocated with a carrier.

The fastening member 10 includes a hook-and-loop fastener area 11 having a plurality of loop-shaped female engagement elements 11a, right and left connection areas 13 which are disposed at both right and left bilateral sides of the hook-and-loop fastener areas 11, and right and left zonal sewn areas 12 (also referred to herein as sewing areas) disposed respectively at further outer sides of the right and left connection areas 13.

The hook-and-loop fastener area 11 of the first embodiment is woven by utilizing warp yarns 17, weft yarns 18, and pile yarns 19. The pile yarns 19 are woven into one face side of the hook-and-loop fastener area 11 as forming a plurality of loops to be the female engagement elements 11a.

In this case, the warp yarns 17 include base warp yarns which constitute a base structure of the hook-and-loop fastener area 11 and thermal adhesive yarns which fix the weaving structure. Polyester fiber is utilized for the base warp yarns. The thermal adhesive yarns utilized for the warp yarns 17 are formed of copolymerized polyester fiber having a low melting point. The thermal adhesive yarns are melted with a heating process and the like after the fastening member 10 of the first embodiment 1 is woven, so that peripheral structural yarn stripes can be fixed. Further, polyester fiber is utilized for the weft yarns 18 and the pile yarns 19 which constitute the hook-and-loop fastener area 11.

The right and left sewn areas 12 are constituted with a plain weaving structure of the warp yarns 17 including base warp yarns and thermal adhesive yarns and the weft yarns 18. The weft yarns 18 of the hook-and-loop fastener area 11 are utilized commonly as the weft yarns 18 to be arranged at the sewn areas 12. In this case, the right and left sewn areas 12 are to be portions through which sewing yarns 7 are thrust when the fastening member 10 of the first embodiment is sewn to a seam portion 2b of a cover material 2 (see FIG. 3) as described later. Therefore, the sewn areas 12 are woven to be a dense structure to stabilize an attaching state of the fastening member 10 to the cover material 2.

The right and left connection areas 13 being constituted only with the weft yarns 18 which are commonly arranged at the hook-and-loop fastener area 11 and the right and left sewn areas 12 directly connect between the hook-and-loop fastener area 11 and the respective right and left sewn areas 12. Further, the connection areas 13 have a non-dense structure as being configured to have a lower yarn density than that of the right and left sewn areas 12.

Figure 2:
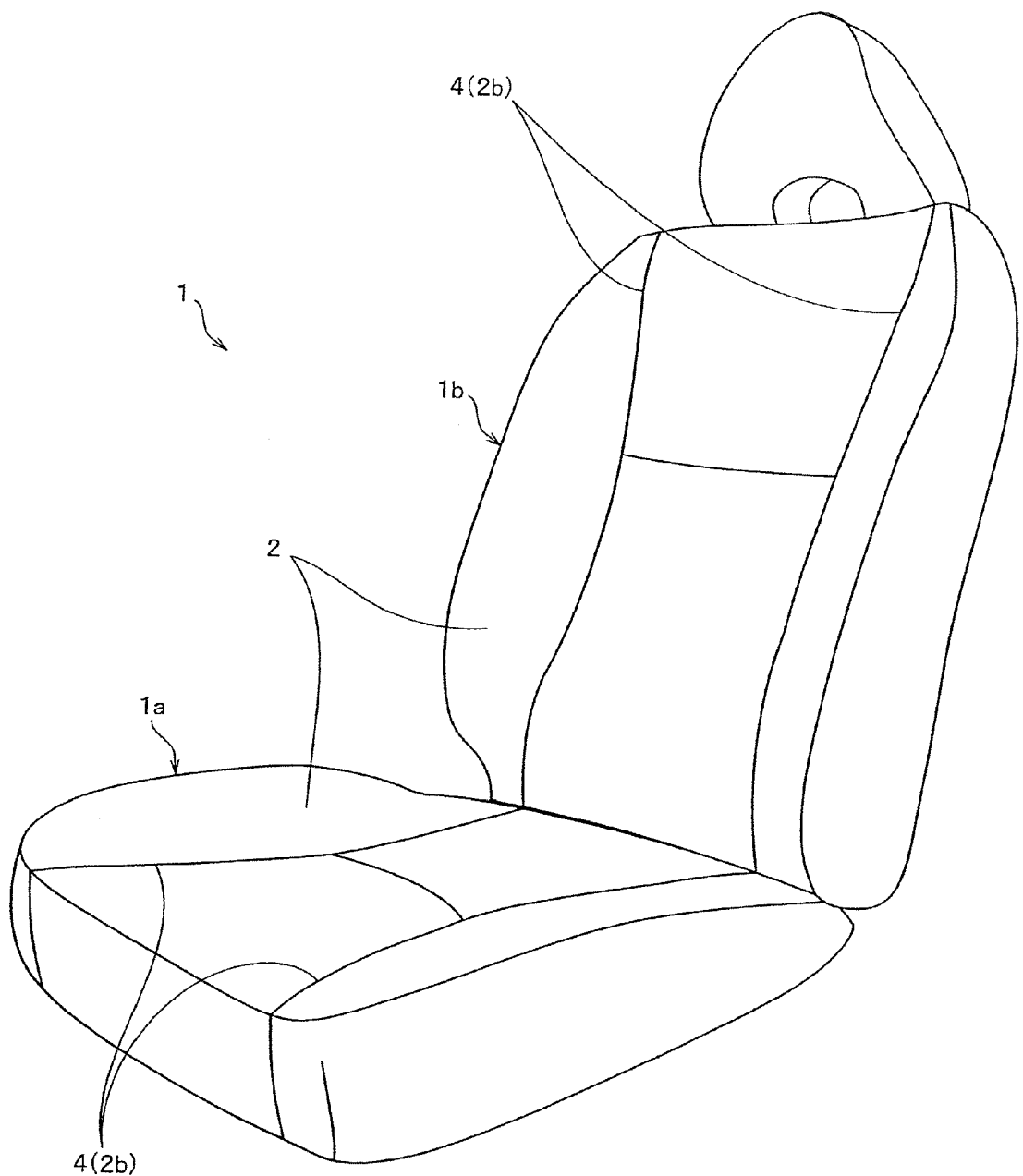
FIG. 2 is a perspective view illustrating a vehicle-use seat in which the fastening member is utilized.

The above fastening member 10 of the first embodiment is utilized as the first fastening member which fastens the cover material 2 to a cushion member 3, for example, for the vehicle-use seat 1 as illustrated in FIG. 2. Following description will be performed on a structure to fasten the cover material 2 to the cushion member 3 as sewing the first fastening member 10 of the first embodiment to the seam portion 2b of the cover material 2.

Figure 3:
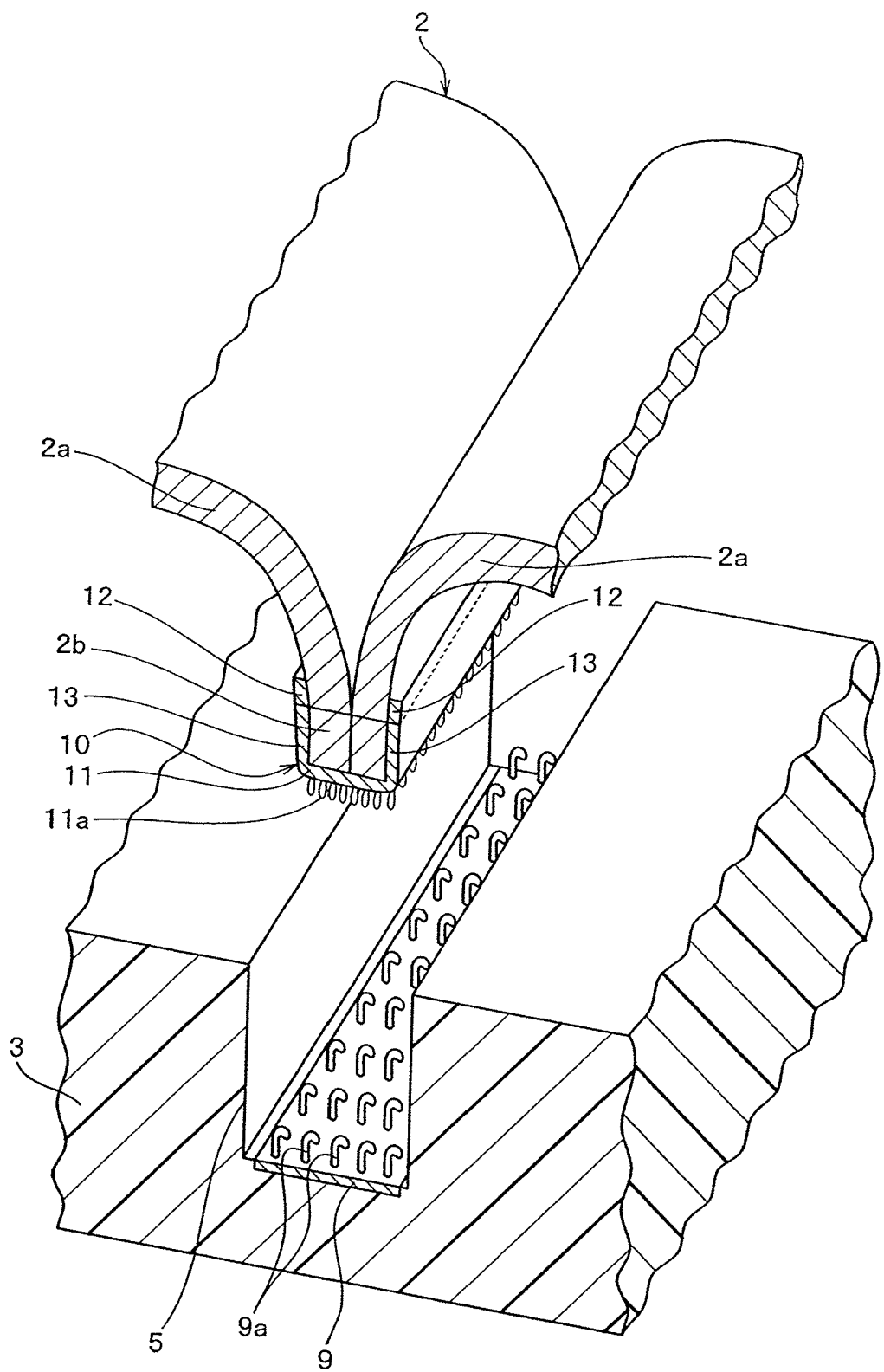
FIG. 3 is a schematic view illustrating a second fastening member fixed to a cushion member and a first fastening member sewn to a cover material.

The vehicle-use seat 1 illustrated in FIG. 2 includes a seat cushion (i.e., a seat portion) 1a and a seat back (i.e., a back rest) 1b. The seat cushion 1a and the seat back 1b are formed respectively by assembling the cover material 2 obtained as sewing a plurality of cover pieces 2a to the cushion member 3 made of resin foam formed into a predetermined shape. Design grooves 4 structured by the seam portions 2b of the cover material 2 are formed at a surface of each of the seat cushion 1a and the seat back 1b. Further, concave grooves 5 as illustrated in FIG. 3 are formed respectively at positions of the cushion member 3 corresponding to the design grooves 4.

To manufacture the above vehicle-use seat 1, the fastening member 10 of the first embodiment is sewn along the seam portion 2b of the cover material 2 as the first fastening member (hereinafter, the fastening member 10 of the first embodiment is described as the first fastening member 10). The first fastening member 10 wraps end parts of the cover pieces 2a by folding the right and left connection areas 13 and the right and left sewn areas 12 along the cover pieces 2a while the hook-and-loop fastener area 11 is contacted to end faces of the cover pieces 2a as the plurality of female engagement elements 11a being downwardly oriented.

Further, the first fastening member 10 is sewn with the sewing yarns 7 by sewing the right and left sewn areas 12 of the first fastening member 10 to the two cover pieces 2a concurrently when cover pieces 2a are sewn with the sewing yarns 7. In this case, as being constituted with a dense structure, the right and left sewn areas 12 of the first fastening member 10 is firmly sewn to the seam portion 2b of the cover material 2 by being sewn with the sewing yarns 7.

Meanwhile, a second fastening member 9 having a plurality of hook-shaped male engagement elements 9a at an upper face side is fixed to a bottom portion of the concave groove 5 formed at the cushion member 3. The second fastening member 9 is integrated with the cushion member 3 by mold-in forming.

Figure 4:
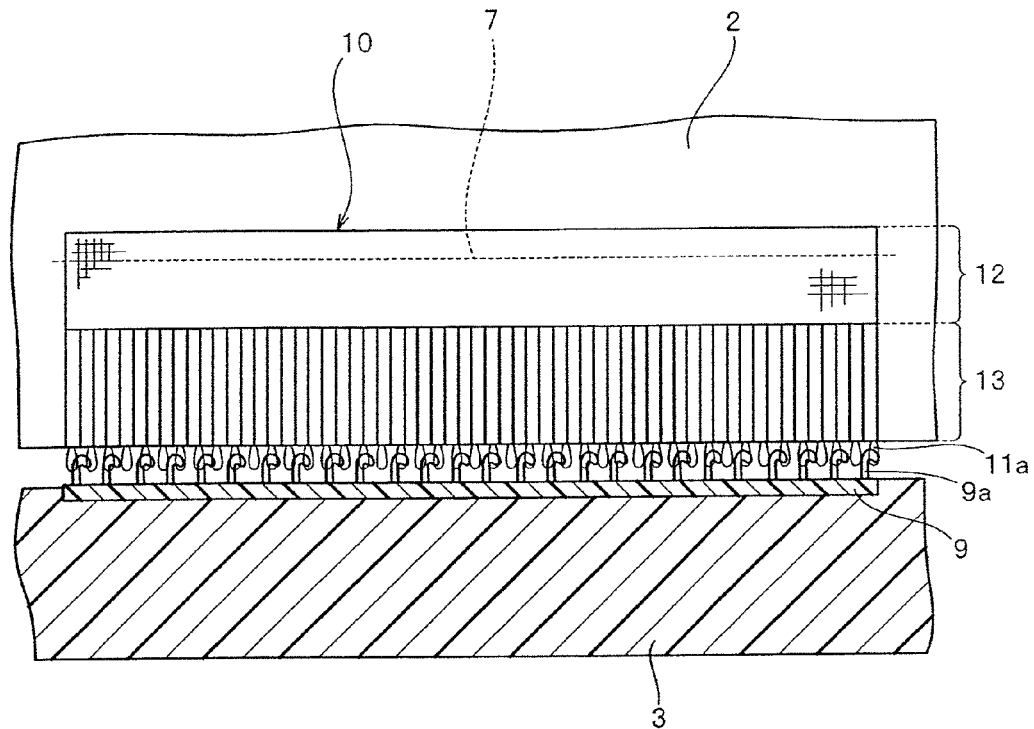
FIG. 4 is a side view illustrating a state that the second fastening member and the first fastening member are engaged.
Figure 5:
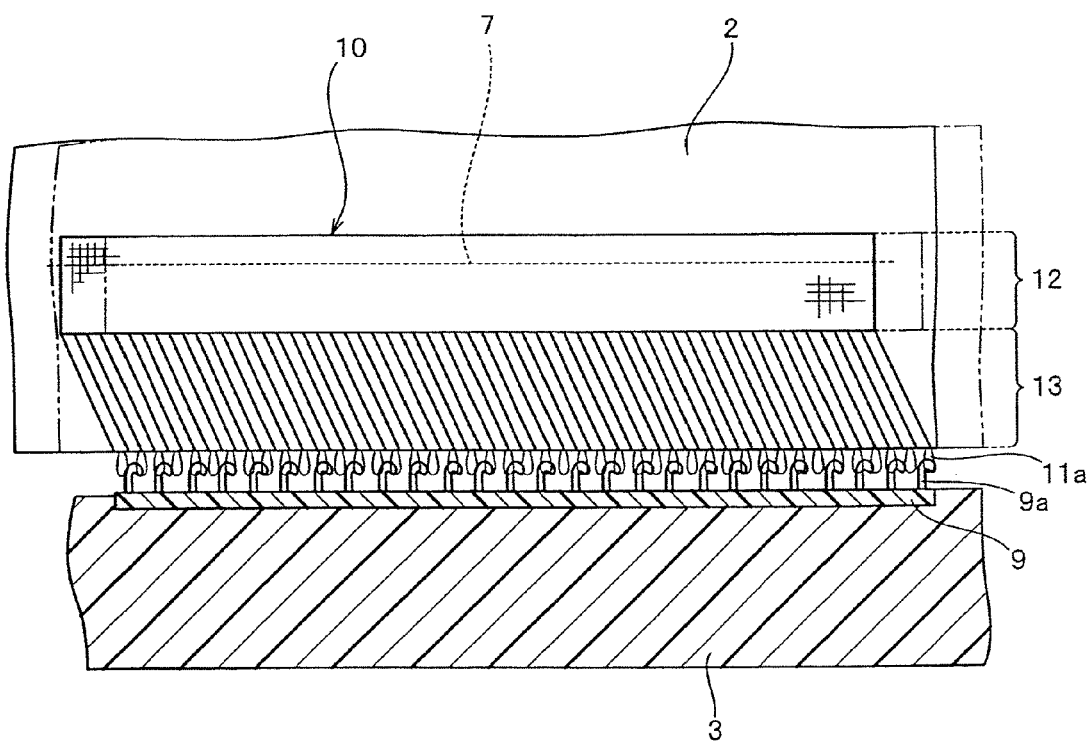
FIG. 5 is a side view illustrating a state that the cover material is displaced relatively to the cushion member.

Then, the first fastening member 10 sewn to the seam portion 2b of the cover material 2 is laid into the concave groove 5 of the cushion member 3 and the female engagement elements 11a arranged at the hook-and-loop fastener area 11 of the first fastening member 10 are engaged with the male engagement elements 9a of the second fastening member 9 which is fixed to the cushion member 3. Accordingly, the cover material 2 can be easily fastened to the cushion member 3 as illustrated in FIG. 4.

At that time, since the first fastening member 10 sewn to the cover material 2 allows the hook-and-loop fastener area 11 to be displaced relatively to the right and left sewn areas 12 along the length direction of the sewn areas 12 owing to deformation of the right and left connection areas 13 which are formed non-densely. Accordingly, the cover material 2 fastened to the cushion member 3 via the first and second fastening members 10, 9 becomes capable of being easily displaced relatively to the cushion member 3 along the length direction of the first fastening member 10. Further, largeness (i.e., degree of freedom) of displacement of the cover material 2 can be largely ensured as well. According to the first fastening member 10 of the first embodiment, the cover material 2 fastened to the cushion member 3 can be easily displaced along the length direction of the first fastening member 10, for example, in a range of approximate 5 mm, and further, in a range of approximate 10 mm.

Accordingly, in the case that the cover material 2 is fastened to the cushion member 3, for example, even if a fastened position of the cover material 2 is shifted from a predetermined position, the cover material 2 can be appropriately moved in the length direction of the first fastening member 10 as receiving tension force at the time when the cover material 2 is subsequently assembled to the cushion member 3 by engaging the end part of the cover material 2 with a back face of the cushion member 3 as being pulled around. In this manner, positional shifting of the cover material 2 can be eased. Accordingly, occurrence of wrinkling at the cover material 2 assembled to the cushion member 3 can be effectively prevented, so that the vehicle-use seat 1 with an excellent appearance can be manufactured.

Further, in the case that cover material 2 is fastened by utilizing the fastening member 10 of the first embodiment, even if variation in dimensions and shapes occurs at each cover material 2, wrinkling occurrence can be prevented as the position of the cover material 2 being appropriately moved along the length direction of the first fastening member 10 after the cover material 2 is fastened to the cushion member 3. Accordingly, assembling operation of the cover material 2 to the cushion member 3 can be performed more easily than before, so that assembling operability of the cover material 2 and productivity of the vehicle-use seat 1 can be easily improved.

Here, in the fastening member 10 of the first embodiment, the connection area 13 is formed only of weft yarns 18 as illustrated in FIG. 1. However, as long as the yarn density of the connection area 13 can be lowered than that of the sewn areas 12, it is also possible that a predetermined number of warp yarns 17 can be woven into the connection area 13.

Here, the female engagement elements can be formed as a part of the weaving structure. Alternatively, it is also possible to form the female engagement elements by bonding nonwoven fabric to a hook-and-loop fastener area on which loops are not formed after the hook-and-loop fastener area is formed without the loops, for example. Naturally, the method to subsequently bond nonwoven fabric can be utilized for a later-mentioned knitting structure as well.

Further, in the fastening member 10 of the first embodiment, the weaving structure is fixed by melting the thermal adhesive yarns which are contained in the warp yarns 17 of the hook-and-loop area 11 and the sewn areas 12, as described above. However, in the invention, instead of the thermal adhesive yarns being contained in the warp yarns 17, it is also possible to fix the weaving structure by forming a synthetic resin layer called a back coat layer at the back face side (i.e., the side to which the female engagement elements 11a are not arranged) of the hook-and-loop fastener area 11 and the sewn areas 12 of the fastening member 10. Alternatively, in some cases, it is also possible to constitute the hook-and-loop fastener area 11 and the sewn areas 12 of the fastening member 10 without utilizing thermal adhesive yarns and without forming a back coat layer.

Second Embodiment

Figure 6:
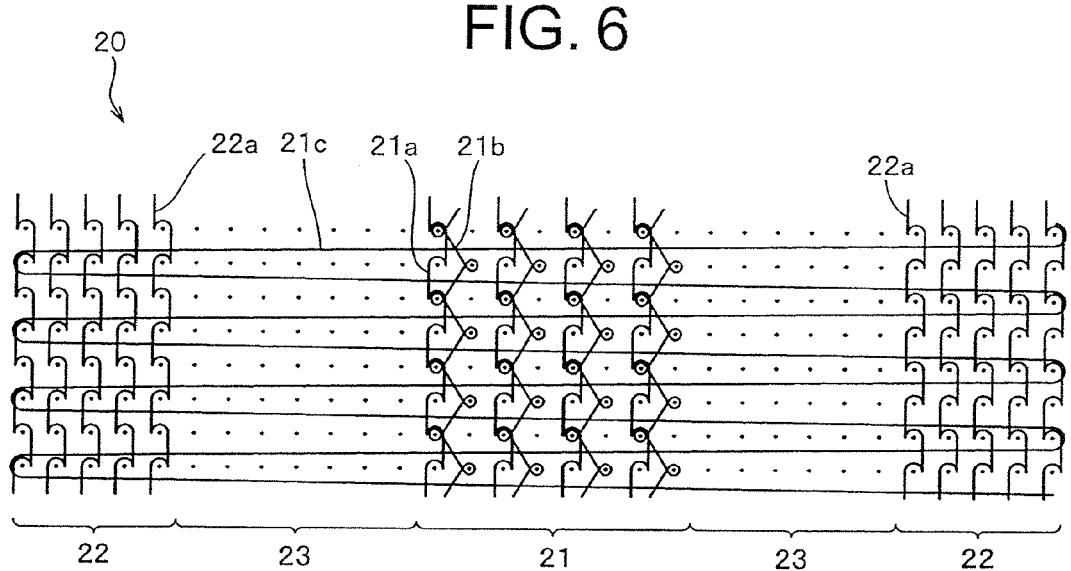
FIG. 6 is a knitting structural view of a fastening member according to the second embodiment of the invention.

FIG. 6 is a structural view illustrating a knitting structure of a fastening member according to the second embodiment. In the second embodiment as well as in the third and fourth embodiments which will be described later, the same numeral is given to a member or a part having the same structure as that described in the first embodiment and the description thereof will not be repeated.

A fastening member 20 of the second embodiment being knitted by utilizing a warp knitting machine includes a hook-and-loop fastener area 21 having a plurality of loop-shaped female engagement elements, right and left connection areas 23 which are disposed at both right and left bilateral sides of the hook-and-loop fastener areas 21, and right and left sewn areas 22 also referred to herein as sewing areas) disposed respectively at further outer sides of the right and left connection areas 23.

The hook-and-loop fastener area 21 of the second embodiment is constituted with chain knitting yarns 21a which form respective wales of the hook-and-loop fastener area 21, tricot knitting yarns 21b which is arranged at each wale to form a number of loops to be female engagement elements, and weft in-laid yarns 21c which are laid in over entire width of the fastening member 20 in a zig-zag manner. Here, multifilament yarns of polyester fiber are utilized for the chain knitting yarns 21a, the weft in-laid yarns 21c, and the tricot knitting yarns 21b and.

The right and left sewn areas 22 are constituted with chain knitting yarns 22a which form respective wales of the sewn areas 22 and the weft in-laid yarns 21c which are laid in over the entire width of the fastening member 20. Further, the right and left connection areas 23 connecting between the hook-and-loop fastener area 21 and the respective right and left sewn areas 22 are constituted only with the weft in-laid yarns 21c which are commonly laid into the hook-and-loop fastener area 21 and the right and left sewn areas 22, that is, only with the weft in-laid yarns 21c which are laid in over the entire width of the fastening member 20. In this manner, the connection areas 23 are configured to have a lower yarn density than that of the right and left sewn areas 22.

Similarly to the fastening member 10 of the first embodiment, for the vehicle-use seat 1, the above fastening member 20 of the second embodiment is utilized as the first fastening member sewn to the seam portion 2b of the cover material 2 and is engaged with the second fastening member 9 which is fixed to the cushion member 3. Accordingly, the cover material 2 can be easily fastened to the cushion member 3.

With the fastening member 20, since the right and left connection areas 23 are formed non-densely, the hook-and-loop fastener area 21 can be displaced relatively to the right and left sewn areas 22 along the length direction of the sewn areas 22 as the connection areas 23 being easily deformed. Accordingly, the cover material 2 fastened to the cushion member 3 via the first fastening member 20 and the second fastening member 9 becomes capable of being easily deformed relatively to the cushion member 3 along the length direction of the first fastening member 20. Further, the degree of freedom of displacement of the cover material 2 can be largely ensured as well.

Accordingly, in the case that the cover material 2 is fastened to the cushion member 3 by utilizing the fastening member 20 of the second embodiment, the cover material 2 can be appropriately moved along the length direction of the first fastening member 20 when receiving tension force, as described in the first embodiment. Therefore, occurrence of wrinkling at the cover material 2 can be effectively prevent when the cover material 2 is assembled to the cushion member 3, so that the seat with an excellent appearance can be manufactured. In addition, with the fastening member 20 of the second embodiment, assembling operation of the cover material 2 to the cushion member 3 can be easily performed, so that assembling operability of the cover material 2 and productivity of the vehicle-use seat 1 can be easily improved.

Figure 7:
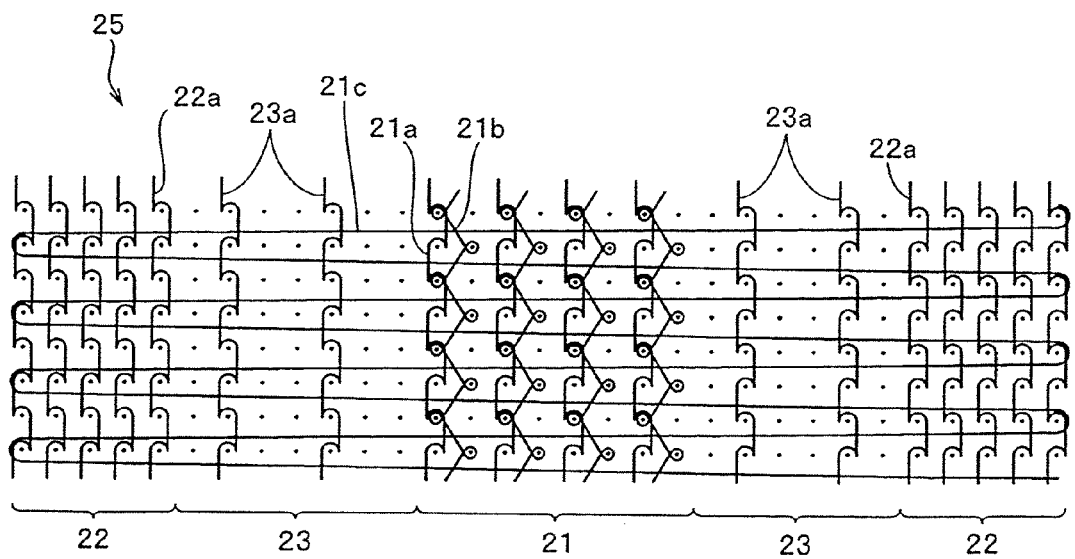
FIG. 7 is a knitting structural view of a fastening member according to a modified example of the second embodiment of the invention.

Here, in the fastening member 20 of the second embodiment, the connection areas 23 are formed only of weft in-laid yarns 21c. However, as long as the knitting yarn density of the connection areas 23 can be lowered than that of the sewn areas 22, it is also possible that a fastening member 25 is structured by knitting with additional knitting yarns such as the chain knitting yarns 23a into the connection areas 23, for example, as illustrated in FIG. 7.

Third Embodiment

Figure 8:
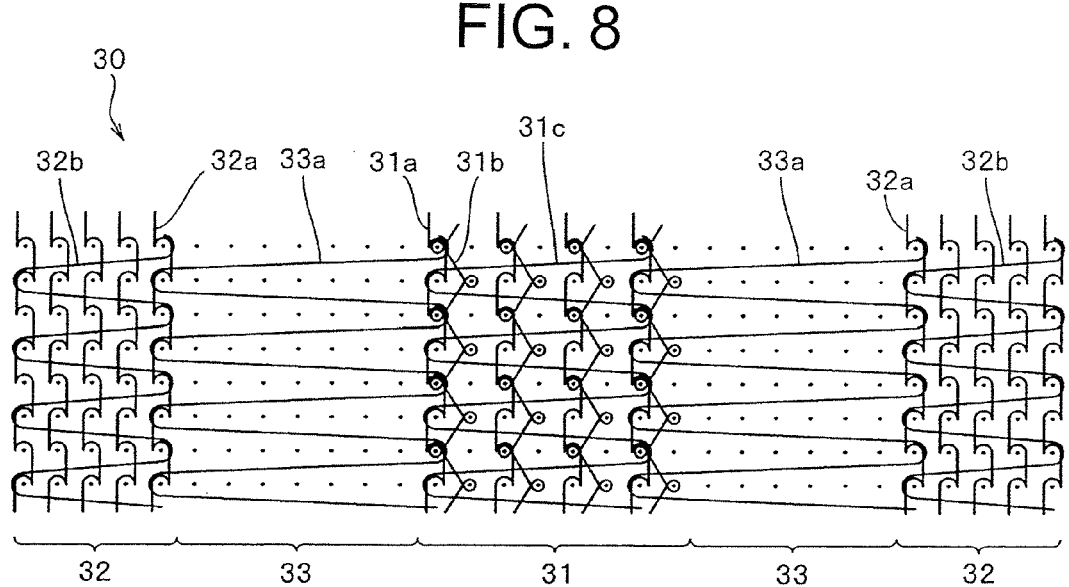
FIG. 8 is a knitting structural view of a fastening member according to the third embodiment of the invention.

FIG. 8 is a structural view illustrating a knitting structure of a fastening member according to the third embodiment.

A fastening member 30 of the third embodiment being knitted by utilizing a warp knitting machine includes a hook-and-loop fastener area 31 having a plurality of loop-shaped female engagement elements, right and left connection areas 33 which are disposed at both right and left bilateral sides of the hook-and-loop fastener areas 31, and right and left sewn areas 32 (also referred to herein as sewing areas) disposed respectively at further outer sides of the right and left connection areas 33.

The hook-and-loop fastener area 31 of the third embodiment is constituted with chain knitting yarns 31a which form respective wales of the hook-and-loop fastener area 31, tricot knitting yarns 31b which form a number of loops to be female engagement elements, and first weft in-laid yarns 31c which are laid into the hook-and-loop fastener area 31 in a zig-zag manner.

The right and left sewn areas 32 are constituted with chain knitting yarns 32a which form respective wales of the sewn areas 32 and second weft in-laid yarns 32b which are laid into the sewn areas 32 in a zig-zag manner. Further, the right and left connection areas 33 are constituted only with third weft in-laid yarns 33a which are laid in so as to connect between a wale arranged at each end edge of the hook-and-loop fastener area 31 and a wale arranged at each inner end edge of the sewn areas 32. The connection areas 33 are configured to be less dense compared to the right and left sewn areas 32.

Similarly to the fastening member 10 of the first embodiment and the fastening member 20 of the second embodiment, for the vehicle-use seat 1, the above fastening member 30 of the third embodiment is utilized as the first fastening member sewn to the seam portion 2b of the cover material 2 and is engaged with the second fastening member 9 which is fixed to the cushion member 3. Accordingly, the cover material 2 can be easily fastened to the cushion member 3.

With the fastening member 30, the hook-and-loop fastener area 31 can be displaced relatively to the right and left sewn areas 32 along the length direction of the sewn areas 32 as the right and left connection areas 33 being easily deformed. Accordingly, the cover material 2 becomes capable of being easily deformed against the cushion member 3. Further, the degree of freedom of displacement of the cover material 2 can be largely ensured as well.

Regarding the fastening member 30 of the third embodiment, it is possible to concurrently knit the hook-and-loop fastener area 31, the sewn areas 32 and the connection areas 33 by utilizing a warp knitting machine. Alternatively, in some cases, it is also possible to manufacture the fastening member 30 of the third embodiment as forming the right and left connection areas 33 by subsequently knitting the third weft in-laid yarns 21c so as to connect between a wale arranged at each end edge of the hook-and-loop fastener area 31 and a wale arranged at each inner end edge of the sewn areas 32 while the hook-and-loop fastener area 31 and the right and left sewn areas 32 are knitted previously and separately.

Here, the right and left connection areas 33 in the fastening member 30 of the third embodiment are constituted with the third in-laid yarns 21c as described above. However, the invention is not limited to the above.

For example, it is also possible to further knit the chain knitting yarns 31a or the tricot knitting yarns 31b additionally to the connection areas 33 of the fastening member 30 of the third embodiment to be in a range of a lower yarn density than that of the sewn areas 32.

Figure 9:
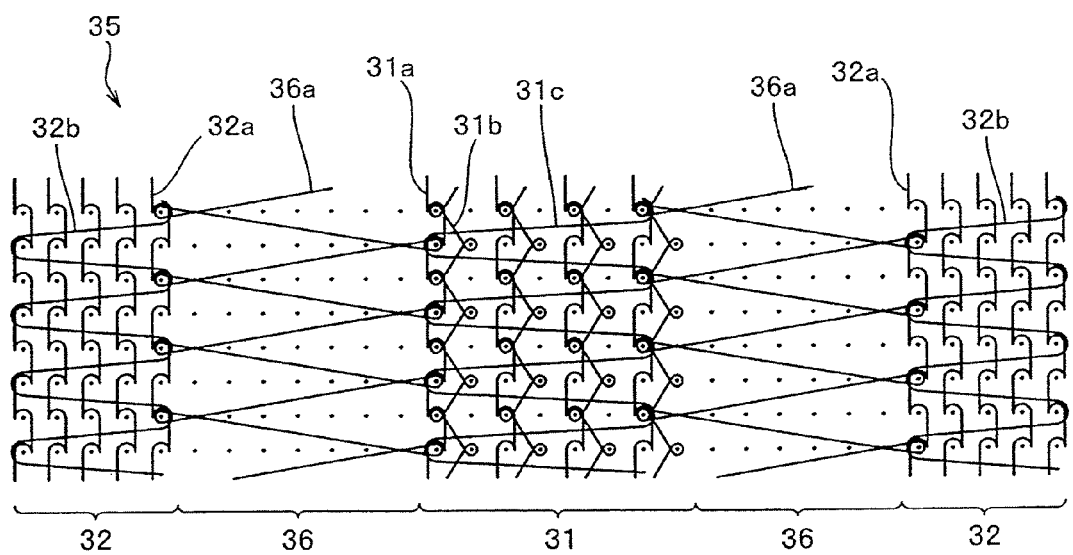
FIG. 9 is a knitting structural view of a fastening member according to a modified example of the third embodiment of the invention.

Further, as illustrated in FIG. 9 as a modified example, it is also possible that right and left connection areas 36 are constituted with single cord knitting yarns 36a running in a zig-zag manner as intersecting between stitches of a wale arranged at each end edge of the hook-and-loop fastener area 31 and stitches of a wale arranged at each inner end edge of the sewn areas 32.

In this case, it is possible to manufacture a fastening member 35 as concurrently knitting the hook-and-loop fastener area 31, the right and left sewn areas 32 and the right and left connection areas 38 by utilizing a warp knitting machine. Alternatively, it is also possible to manufacture the fastening member 35 as forming the right and left connection areas 38 by subsequently knitting the single cord yarns 38a while the hook-and-loop fastener area 31 and the right and left sewn areas 32 are knitted previously and separately.

Figure 10:
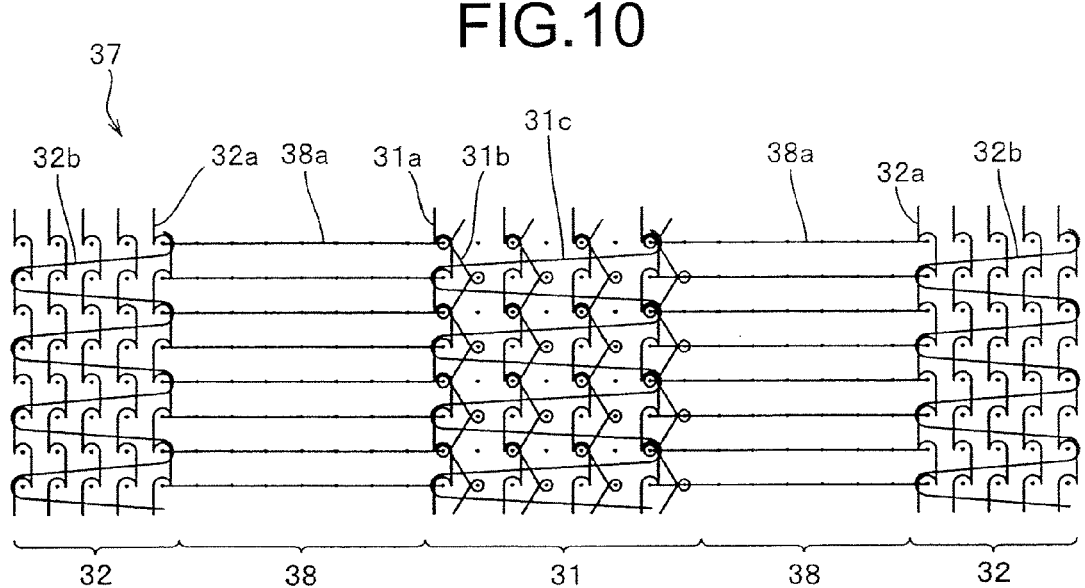
FIG. 10 is a knitting structural view of a fastening member according to another modified example of the third embodiment of the invention.

Further, as illustrated in FIG. 10 as another modified example, it is also possible to manufacture a fastening member 37 as forming right and left connection areas 38 with connecting yarns 38a which connect stitches of a wale arranged at each end edge of the hook-and-loop fastener area 31 and stitches of a wale arranged at each inner end edge of the sewn areas 32.

Fourth Embodiment

Figure 11:
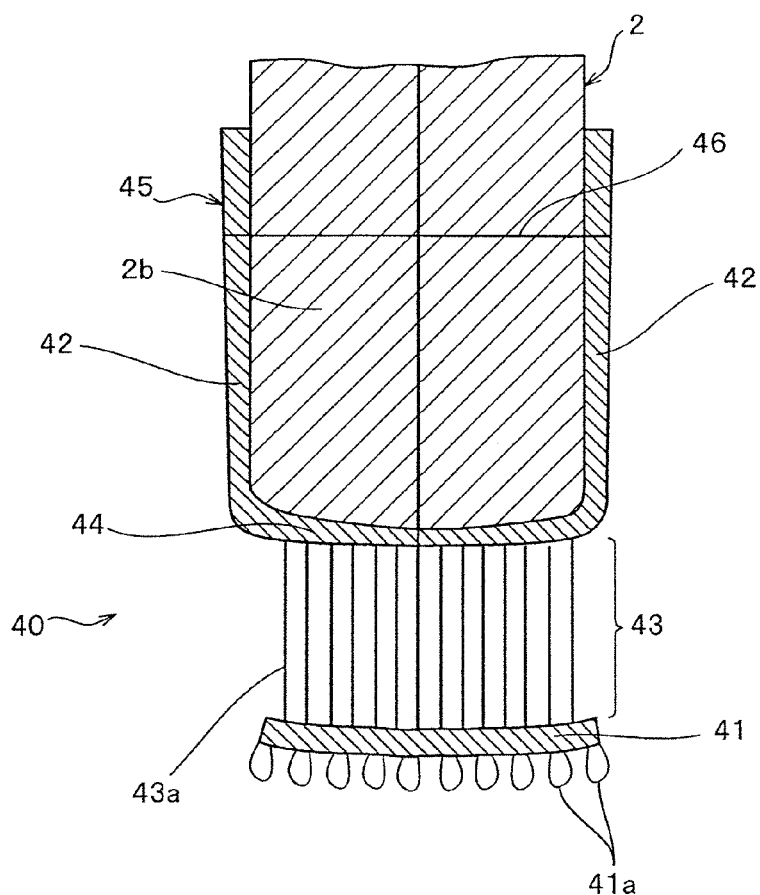
FIG. 11 is a schematic view illustrating a state that a fastening member according to the fourth embodiment of the invention is sewn to a cover material.
Figure 12:
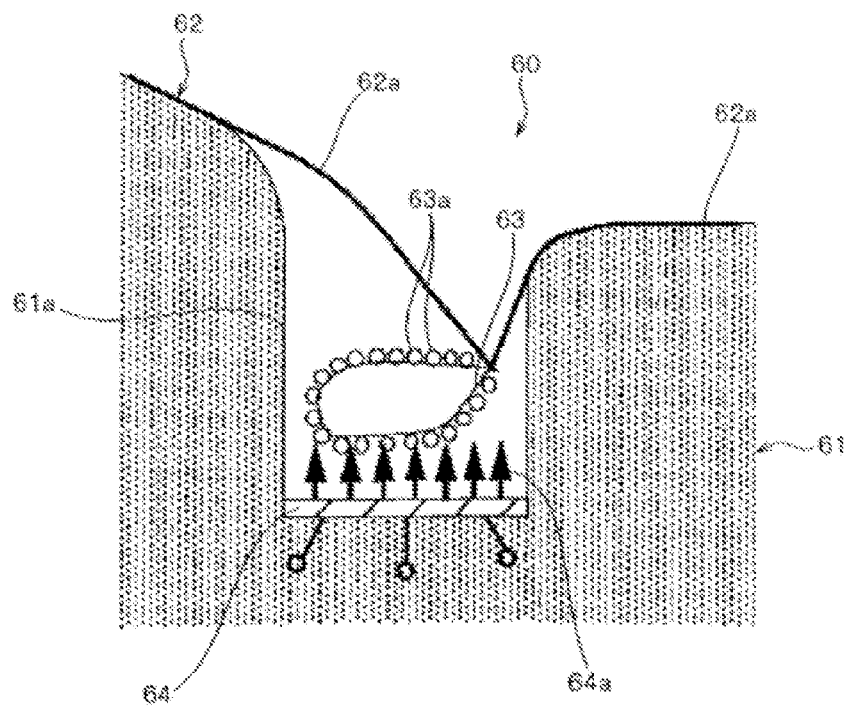
FIG. 12 is a sectional view illustrating a state that a cover material is fastened to a cushion member by utilizing fastening means in the conventional art.
Figure 13:
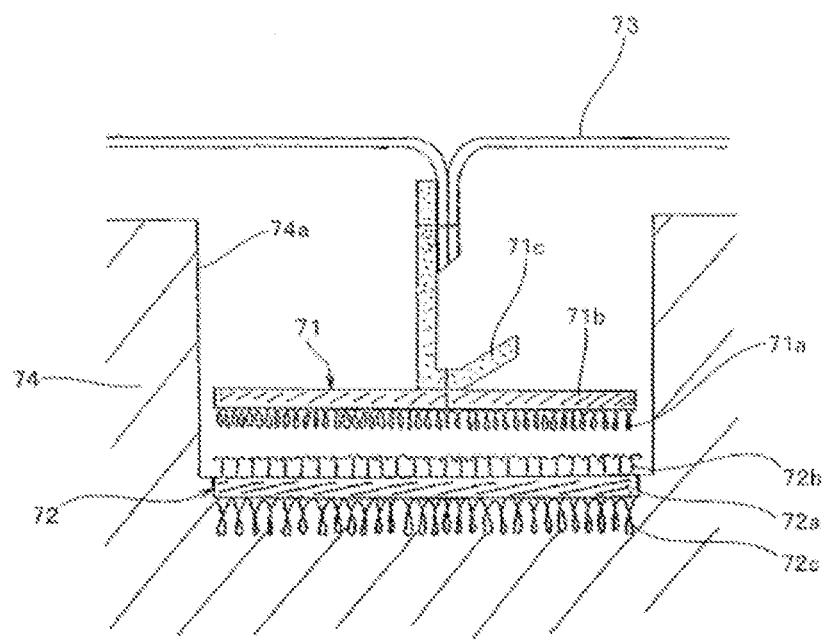
FIG. 13 is a sectional view illustrating a state that a cover material is fastened to a cushion member by utilizing other fastening means in the conventional art.
Figure 14:
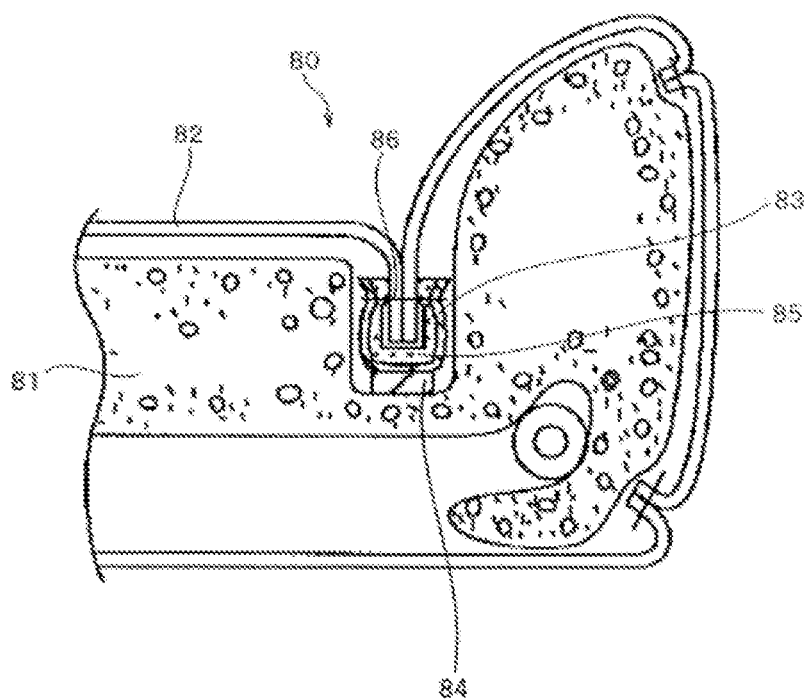
FIG. 14 is a sectional view illustrating a state that a cover material is fastened to a cushion member by utilizing further other fastening means in the conventional art.

FIG. 11 is a schematic view illustrating a state that a fastening member according to the fourth embodiment is sewn to the cover material.

A fastening member 40 of the fourth embodiment includes a hook-and-loop fastener area 41 having a plurality of loop-shaped female engagement elements 41a, right and left sewn areas 42 (also referred to herein as sewing areas) which are to be sewn to the cover material 2, an intermediate tape area 44 which is disposed between the right and left sewn areas 42, and a connection area 43 which connects between the hook-and-loop fastener area 41 and the intermediate tape area 44.

In this case, the right and left sewn areas 42 and the intermediate tape area 44 are constituted with a single sheet of a tape body 45 which is woven or knitted to be a dense structure. The sewn areas 42 can be securely sewn to the cover material 2 by sewing the right and left sewn areas 42 and the cover material 2 with sewing yarns 46.

The hook-and-loop fastener area 41 is constituted with a weaving structure or a knitting structure and is provided with a plurality of female engagement elements 41a on its one face (i.e., a lower face). The connection area 43 is constituted with a plurality of connecting yarns 43a which connect the hook-and-loop fastener area 41 and the intermediate tape area 44. One end of the connection area 43 is connected to the hook-and-loop fastener area 41 and the other end of the connection area 43 is connected indirectly to the right and left sewn areas 42 via the intermediate tape area 44.

The above fastening member 40 of the fourth embodiment can be easily manufactured by subsequently connecting the intermediate tape area 44 of the tape body 45 and the hook-and-loop fastener area 41 with the connecting yarns 43a which constitute the connection area 43 while the hook-and-loop fastener area 41 and the tape body 45 having the right and left sewn areas 42 and the intermediate tape area 44 are prepared previously and separately, for example.

Then, the fastening member 40 of the fourth embodiment is sewn to the seam portion 2b of the cover material 2 as the first fastening member 40 and is engaged with the second fastening member fixed to the cushion member (not illustrated). Accordingly, the cover material 2 can be easily fastened to the cushion member.

With the fastening member 40, the hook-and-loop fastener area 41 can be easily displaced against the right and left sewn areas 42 in the length direction of the sewn areas 42 as well as in the width direction of the intermediate tape area 44 owing to deformation of the connection area 43. Therefore, occurrence of wrinkling at the cover material 2 can be effectively prevented when the cover material 2 is assembled to the cushion member 3. In addition, assembling operability of the cover material 2 can be further improved.

Here, in the above description of the fourth embodiment, the tape body 45 and the hook-and-loop fastener area 41 are prepared previously and separately. However, in the invention, it is also possible to manufacture the fastening member as concurrently preparing the tape body 45 and the hook-and-loop fastener area 41.

It is possible to manufacture the fastening member of the fourth embodiment as follows as an example of a preparing method of the above. For example, tricot knitting yarns are further knitted additionally into a knitting structure of the hook-and-loop fastener area 21 as described in the second embodiment. Further, the added tricot knitting yarns is knitted into a knitting structure (or is woven into a weaving structure) of the intermediate tape area 44 of the tape body 45 while being elongated to form the connection area.

Alternatively, it is also possible to manufacture the fastening member of the fourth embodiment by concurrently weaving the connecting yarns 43a which connect the intermediate tape area 44 of the tape body 45 and the hook-and-loop fastener area 41 while the tape body 45 and the hook-and-loop fastener area 41 are woven as doubly-weaving by utilizing a needle loom.

EXPLANATIONS OF LETTERS AND NUMERALS

1 Vehicle-use seat
1a Seat cushion
1b Seat back
2 Cover material
2a Cover piece
2b Seam portion
3 Cushion member
4 Design groove
5 Concave groove
7 Sewing yarn
9 Second fastening member
9a Male engagement element
10 Fastening member (First fastening member)
11 Hook-and-loop fastener area
11a Female engagement element
12 Sewn area
13 Connection area
17 Warp yarn
18 Weft yarn
19 Pile yarn
20 Fastening member (First fastening member)
21 Hook-and-loop fastener area
21a Chain knitting yarn
21b Tricot knitting yarn
21c Weft in-laid yarn
22 Sewn area
22a Chain knitting yarn
23 Connection area
23a Chain knitting yarn
25 Fastening member
30 Fastening member
31 Hook-and-loop fastener area
31a Chain knitting yarn
31b Tricot knitting yarn
31c First weft in-laid yarn
32 Sewn area 32a Chain knitting yarn
32b Second weft in-laid yarn
33 Connection area
33a Third weft in-laid yarn
35 Fastening member
36 Connection area
36a Single cord knitting yarn
37 Fastening member
38 Connection area
38a Connecting yarn
40 Fastening member
41 Hook-and-loop fastener area
41a Female engagement element
42 Sewn area
43 Connection area
43a Connecting yarn
44 Intermediate tape area
45 Tape body
46 Sewing yarn

The invention claimed is:

1. A fastening member, comprising:
a hook-and loop fastener area, which has a plurality of female engagement elements or male engagement elements formed on one face of the hook-and-loop fastener area;
a right sewing area and a left sewing area, wherein the right sewing area and the left sewing area are woven or knitted; and
a right connection area which connects the right sewing area to one edge portion of the hook-and-loop fastener area and a left connection area which connects the left sewing area to an opposite edge portion of the hook-and-loop fastener area,
wherein the right and left connection areas are woven or knitted, and a weaving or knitting density of the right and left connection areas is lower than a weaving or knitting density of the right and left sewing areas.

2. The fastening member according to claim 1, wherein the right and left connection areas allow the hook-and-loop fastener area to be displaced relative to the right and left sewing areas in multiple directions.

3. The fastening member according to claim 1, wherein the right and left sewing areas are capable of being sewn to a cover member to attach the fastening member to the cover member.

4. The fastening member according to claim 1, wherein the right and left sewing areas and the hook-and-loop fastener area are woven, and
the right and left connection areas are formed of only weft yarns or are formed of a weaving structure having a lower density of warp yarns than that of the right and left sewing areas.

5. The fastening member according to claim 1, wherein the right and left sewing areas and the hook-and-loop fastener area are knitted, and
the right and left connection areas are formed of weft in-laid yarns which are laterally laid into the right and left sewing areas and the hook-and-loop fastener area.

6. The fastening member according to claim 1, wherein the right and left sewing areas and the hook-and-loop fastener area are knitted, and
the right and left connection areas are formed of weft in-laid yarns, knitting yarns or connecting yarns, wherein a first yarn connects wales arranged at the one edge portion of the hook-and-loop fastener area and wales arranged at an inner edge portion of the right sewing area and a second yarn connects wales arranged at the opposite edge portion of the hook-and-loop fastener area and wales arranged at an inner edge portion of the left sewing area.

7. The fastening member according to claim 1, further comprising an intermediate tape area, wherein the intermediate tape area is between the right sewing area and the right connection area and between the left sewing area and the left connection area.

* * * * *

UNITED STATES PATENT AND TRADEMARK OFFICE
CERTIFICATE OF CORRECTION

| | |
|---|---|
| PATENT NO. | : 9,061,882 B2 |
| APPLICATION NO. | : 13/202596 |
| DATED | : June 23, 2015 |
| INVENTOR(S) | : Yuichi Masuda et al. |

It is certified that error appears in the above-identified patent and that said Letters Patent is hereby corrected as shown below:

Specification

In column 10, line 60, delete "also" and insert -- (also --, therefor.

In column 14, line 35, delete "Cover" and insert -- 2 Cover --, therefor.

Signed and Sealed this
Twenty-fourth Day of November, 2015

Michelle K. Lee
*Director of the United States Patent and Trademark Office*